(12) United States Patent
Merrill

(10) Patent No.: US 10,667,538 B2
(45) Date of Patent: Jun. 2, 2020

(54) NON-FAT DRY MILK PRODUCTION PROCESSES FOR CHEESEMAKING

(75) Inventor: Richard K. Merrill, Highlands Ranch, CO (US)

(73) Assignee: Leprino Foods Company, Denver, CO (US)

( * ) Notice: Subject to any disclaimer, the term of this patent is extended or adjusted under 35 U.S.C. 154(b) by 900 days.

(21) Appl. No.: 11/936,624

(22) Filed: Nov. 7, 2007

(65) Prior Publication Data

US 2009/0117228 A1 May 7, 2009

(51) Int. Cl.
| | | |
|---|---|---|
| *A23C 19/06* | (2006.01) | |
| *A23C 1/04* | (2006.01) | |
| *A23C 9/12* | (2006.01) | |
| *A23C 9/13* | (2006.01) | |
| *A23C 9/16* | (2006.01) | |
| *A23C 19/05* | (2006.01) | |
| *A23C 19/068* | (2006.01) | |

(52) U.S. Cl.
CPC .............. *A23C 19/06* (2013.01); *A23C 1/04* (2013.01); *A23C 9/1209* (2013.01); *A23C 9/1213* (2013.01); *A23C 9/1322* (2013.01); *A23C 9/16* (2013.01); *A23C 19/05* (2013.01); *A23C 19/0684* (2013.01); *A23C 2250/15* (2013.01)

(58) Field of Classification Search
USPC ......................................................... 426/582
See application file for complete search history.

(56) References Cited

U.S. PATENT DOCUMENTS

| | | | |
|---|---|---|---|
| 2,851,363 | A | 9/1958 | Kielsmeier |
| 4,018,752 | A | 4/1977 | Buhler et al. |
| 4,066,791 | A | 1/1978 | Corbin, Jr. |
| 4,169,160 | A * | 9/1979 | Wingerd et al. ............... 426/40 |
| 4,202,907 | A | 5/1980 | Poarch |
| 4,621,058 | A | 11/1986 | Reddy |
| 4,851,237 | A | 7/1989 | Bussiere et al. |

(Continued)

FOREIGN PATENT DOCUMENTS

| | | |
|---|---|---|
| AR | 048727 | 5/2006 |
| AR | 049581 | 8/2006 |

(Continued)

OTHER PUBLICATIONS

United States Patent and Trademark Office International Search Report and Written Opinion, dated Dec. 11, 2008, pp. 1-10, PCT/US08/78757.

(Continued)

*Primary Examiner* — D. Lawrence Tarazano
*Assistant Examiner* — Philip A Dubois
(74) *Attorney, Agent, or Firm* — Kilpatrick Townsend & Stockton, LLP

(57) ABSTRACT

Methods of making a powdered dairy composition are disclosed. The methods may include the steps of adding a sequestrant for calcium and rennet to a milk composition to make treated milk, and forming the treated milk into a milk powder. Powdered non-fat dry milk products are also disclosed. The products may include one or more milk proteins that have been enzymatically altered by chymosin, where the chymosin altered proteins are not coagulated. The products may also include one or more sequestants to bind calcium ions in the powdered product.

28 Claims, 6 Drawing Sheets

(56) References Cited

U.S. PATENT DOCUMENTS

| | | | |
|---|---|---|---|
| 5,165,945 A | 11/1992 | Yee et al. | |
| 5,547,691 A | 8/1996 | Kjaer et al. | |
| 5,554,397 A | 9/1996 | Tanaka et al. | |
| 5,902,625 A | 5/1999 | Barz et al. | |
| 6,183,802 B1* | 2/2001 | Silva et al. | 426/580 |
| 6,372,286 B1 | 4/2002 | Silver et al. | |
| 7,026,004 B2 | 4/2006 | Loh et al. | |
| 7,579,033 B2 | 8/2009 | Merrill et al. | |
| 7,585,537 B2 | 9/2009 | Merrill et al. | |
| 7,651,715 B2 | 1/2010 | Merrill et al. | |
| 2004/0213884 A1* | 10/2004 | Abboud et al. | 426/582 |
| 2005/0249853 A1 | 11/2005 | Merrill et al. | |
| 2005/0249854 A1 | 11/2005 | Merrill et al. | |
| 2005/0271789 A1 | 12/2005 | Merrill et al. | |
| 2006/0008555 A1 | 1/2006 | Merrill et al. | |
| 2006/0057248 A1* | 3/2006 | Lincourt | A23C 19/028 426/36 |
| 2007/0020371 A1* | 1/2007 | Cuksey et al. | 426/583 |
| 2007/0082086 A1 | 4/2007 | Carr et al. | |
| 2009/0117228 A1 | 5/2009 | Merrill | |

FOREIGN PATENT DOCUMENTS

| | | |
|---|---|---|
| AR | 051808 | 2/2007 |
| AU | 2990089 A | 8/1989 |
| JP | 2006-528487 A | 12/2006 |
| KR | 10-2006-0034715 A | 4/2006 |
| KR | 10-2007-0063473 A | 6/2007 |
| NZ | 527159 A | 10/2005 |
| NZ | 585272 | 5/2013 |
| NZ | 609792 | 10/2014 |
| WO | 2005/009138 A1 | 2/2005 |
| WO | 2005/107486 A2 | 11/2005 |
| WO | 2006/014487 A2 | 2/2006 |
| WO | 2006066332 | 6/2006 |
| WO | WO 2006/066332 A1 | 6/2006 |
| WO | 2009/061571 | 5/2009 |
| WO | 2009/061571 A1 | 5/2009 |

OTHER PUBLICATIONS

Caspe, Saul et al., "Sodium Hexametaphosphate as an Anticoagulant: A Preliminary Study," Amer. Jour. Pharm., May 1942, pp. 175-179.
Deman, J. M., "Effect of Ortho- and Polyphosphates on Milk Stability as Measured by Rennet Coagulation Time," English Abstract, XVII International Dairy Congress B 365-370 (1966), p. 733.
El-Shibiny, Safinaz et al., "Effect of Some Salt Additives on the Rennet Coagulation of Buffalo Milk," Polish Journal of Food and Nutrition Sciences, vol. 3/44, No. 4, Dec. 1994, pp. 87-93.
Esteves, C. L. C., et al., "Effect of pH on the Gelatin Properties of Skim Milk Gels Made From Plant Coagulants and Chymosin," J. Dairy Sci., 86: pp. 2558-2567, 2003.
Gastaldi, E. et al., "Effect of Controlled Casein Hydrolysis on Rheological Properties of Acid Milk Gels," J. Dairy Sci., 86: pp. 704-711, 2003.
McMahon, Donald J. et al., "Effects of Phosphate and Citrate on the Gelatin Properties of Casein Micelles in Renneted Ultra-High Temperature (UHT) Sterilized Concentrated Milk," Food Structure, vol. 10 (1991), pp. 27-36.
Mizuno, R. et al., "Effects of Emulsifying Salts on the Turbidity and Calcium-Phosphate—Protein Interactions in Casein Micelles," J. Dairy Sci.,2005, 88: pp. 3070-3078.
Odagiri, S. et al., "Complexing of Calcium by Hexametaphosphate, Oxalate, Citrate, and Ethylenediamine-Tetraacetate in Milk: Dialysis of Milk Containing Complexing Agents," Department of Food Science and Technology, University of California, Davis, Jul. 31, 1964, pp. 19-22.
Odagiri, S. et al., "Complexing of Calcium by Hexametaphosphate, Oxalate, Citrate, and EDTA in Milk: Effects of Complexing Agents on Turbidity and Rennet Coagulation," Department of Food Science and Technology, University of California, Davis, Jun. 23, 1964, pp. 1306-1309.
Udabage, P. et al., "Effects of Mineral Salts and Calcium Chelating Agents on the Gelation of Renneted Skim Milk," 2001, J. Dairy Sci., 84: pp. 1569-1575.
Vidal, V., et al., "Effect of Succinylation on the Rennet Coagulation of Milk," 1998, J. Dairy Sci., 81: pp. 69-75.
European Patent Application No. 08846654, Extended European Search Report dated Jul. 6, 2011, 8 pages.
Examination Notification Art 94(3) dated Jun. 10, 2014 for application #: EP 08846654.5, 8 pages.
Office Action dated Aug. 7, 2014 for application #: MX/a/2010/005103, 9 pages.
First Examination Report in New Zealand application NZ700942, dated Oct. 29,2014, 3 pages.
Notice of Allowance in MX/a/2010/005103 dated Dec. 2, 2014.
Australian Office Action (Direction to Request Examination) dated Apr. 11, 2012 for Australian Patent Application No. AU2008325000 filed on Oct. 3, 2008, all pages.
Australian Office Action (Patent Examination Report No. 1) dated Nov. 22, 2012 for Australian Patent Application No. AU2008325000 filed on Oct. 3, 2008, all pages.
Australian Office Action (Patent Examination Report No. 2) dated Feb. 8, 2013 for Australian Patent Application No. AU2008325000 filed on Oct. 3, 2008, all pages.
Australian Office Action (Notice of Acceptance) dated Jul. 12, 2013 for Australian Patent Application No. AU2008325000 filed on Oct. 3, 2008, all pages.
Australian Office Action (Statement of Grounds and Particulars) dated Jan. 27, 2014 for Australian Patent Application No. AU2008325000 filed on Oct. 3, 2008, all pages.
Australian Office Action (Application for Dismissal of Opposition) dated Feb. 13, 2014 for Australian Patent Application No. AU2008325000 filed on Oct. 3, 2008, all pages.
Australian Office Action (Acknowledgement of Affidavit's) dated Jul. 31, 2014 for Australian Patent Application No. AU2008325000 filed on Oct. 3, 2008, all pages.
Australian Office Action (Notification of Advertisement of Amendment to the Specification)) dated Apr. 7, 2015 for Australian Patent Application No. AU2008325000 filed on Oct. 3, 2008, all pages.
Canadian Office Action (Notification of a Requisition by the Examiner) dated Jan. 20, 2015 for Canadian Patent Application No. CA2704935 filed on Oct. 3, 2008, all pages.
Chinese Second Office Action dated Nov. 5, 2012 for Chinese Patent Application No. CN200880120027.7 filed on Oct. 3, 2008, all pages.
Chinese Third Office Action dated Jul. 30, 2013 for Chinese Patent Application No. CN200880120027.7 filed on Oct. 3, 2008, all pages.
Chinese Office Action (Decision of Rejection) dated Sep. 3, 2014 for Chinese Patent Application No. CN200880120027.7 filed on Oct. 3, 2008, all pages.
European Office Action (Examination Notification Art 94(3)) dated Mar. 20, 2012 for European Patent Application No. EP08846654.5 filed on Oct. 3, 2008, all pages.
European Office Action (Examination Notification Art 94(3)) dated Jul. 31, 2012 for European Patent Application No. EP08846654.5 filed on Oct. 3, 2008, all pages.
European Office Action (Examination Notification Art 94(3)) dated May 22, 2013 for European Patent Application No. EP08846654.5 filed on Oct. 3, 2008, all pages.
European Office Action (Examination Notification Art 94(3)) dated Nov. 26, 2013 for European Patent Application No. EP08846654.5 filed on Oct. 3, 2008, all pages.
Japanese Office Action (Notification of Reasons for Rejection) forwarded Oct. 2, 2012 for Japanese Patent Application No. JP2010-533137 filed on Oct. 3, 2008, all pages.
Japanese Office Action (Decision of Rejection) forwarded Jul. 16, 2013 for Japanese Patent Application No. JP2010-533137 filed on Oct. 3, 2008, all pages.

(56) References Cited

OTHER PUBLICATIONS

Japanese Office Action (Notice of Allowance) forwarded Mar. 4, 2014 for Japanese Patent Application No. JP2010-533137 filed on Oct. 3, 2008, all pages.
Japanese Office Action (Notification of Reasons for Rejection) forwarded on Feb. 3, 2015 for Japanese Patent Application No. JP2013-236026 filed on Oct. 3, 2008, all pages.
Korean Office Action (Notice to File a Response) dated Mar. 23, 2015 for Korean Patent Application No. KR1020107012534 filed on Oct. 3, 2008, all pages.
New Zealand Office Action (Examination Report) dated Mar. 23, 2012 for New Zealand Patent Application No. NZ585272 filed on Oct. 3, 2008, all pages.
New Zealand Office Action (Examination Report) dated Jul. 5, 2012 for New Zealand Patent Application No. NZ585272 filed on Oct. 3, 2008, all pages.
New Zealand Office Action (Further Examination Report) dated Mar. 12, 2013 for New Zealand Patent Application No. NZ585272 filed on Oct. 3, 2008, all pages.
New Zealand Office Action (Notice of Acceptance) dated Apr. 29, 2013 for New Zealand Patent Application No. NZ585272 filed on Oct. 3, 2008, all pages.
New Zealand Office Action (Examination Report) dated Sep. 7, 2012 for New Zealand Patent Application No. NZ602151 filed on Oct. 3, 2008, all pages.
New Zealand Office Action (Notice of Acceptance) dated Mar. 6, 2014 for New Zealand Patent Application No. NZ602151 filed on Oct. 3, 2008, all pages.
New Zealand Office Action (First Examination Report) dated Apr. 24, 2013 for New Zealand Patent Application No. NZ609792 filed on Oct. 3, 2008, all pages.
International Preliminary Report on Patentability dated May 11, 2010 for International Patent Application No. PCT/US2008/078757 filed on Oct. 3, 2008, all pages.
Australian Patent Application No. AU2013224693, "Second Examiners Report", dated Jul. 15, 2016, 3 pages.
Canadian Patent Application No. CA2,704,935, "Office Action", dated Jun. 23, 2016, 3 pages.
Chinese Patent Application No. 200880120027.7, "Notification of Reexamination", dated Jul. 29, 2016.
Korean Patent Application No. KR10-2010-7012534, "Office Action", dated Jun. 29, 2016, 8 pages.
Patent Examination Report No. 1 dated Mar. 11, 2016 for Australian Application No. 2013224693, all pages.
NZ Patent Application No. 721716, "First Examination Report", dated Sep. 9, 2016, 1 pages.
NZ Patent Application No. 719351, "Further Examination Report", dated Sep. 9, 2016, 2 pages.
New Zealand Patent Application No. 71935, "Subsequent Examination Report " dated Jan. 10, 2017, 3 pages.
New Zealand Patent Application No. 721716, "Substantive Examination Report" dated Jan. 10, 2017, 4 pages.
Australia Patent Application No. 2016204500, "First Examiner Report Received" dated Feb. 2, 2017, 11 pages.
Korea Patent Application No. 10-2010-7012534, "Final Office Action" dated Feb. 28, 2017, 13 pages.

\* cited by examiner

NON-FAT DRY MILK PRODUCTION PROCESSES FOR CHEESEMAKING

CROSS-REFERENCES TO RELATED APPLICATIONS

NOT APPLICABLE

BACKGROUND OF THE INVENTION

Traditional methods of making mozzarella cheese typically start with pasteurizing cow's or buffalo's milk, adding cheese cultures, acidifying the milk to convert it into cheese milk, coagulating the cheese milk to obtain a coagulum, cutting the coagulum to obtain curds and whey, and separating the liquid whey from the solid cheese curd. The cheese curd is then heated, kneaded and stretched until it becomes a fibrous mass of heated, cheese. This fibrous mass of cheese may then be formed or extruded into a shape and cooled into a more rigid solid. The solid cheese can then be further processed depending on how the cheese will be used. For example if the cheese is being spread on pizza, the fibrous mass of heated cheese may be shaped into ribbons or blocks and cooled in brine. The cooled, hardened cheese may then be chopped into square or rectangular slabs that are supplied to dicing equipment, which cuts each slab into shredded cheese for pizza.

The process outlined above is commonly called the "pasta filata process." Variations of the process may be used to make a variety of cheeses, such as mozzarella variety cheeses (which include traditional mozzarella cheeses), provolone cheeses, scamorze cheeses, pasta filata cheeses, and cheeses used on pizza (i.e., pizza cheeses), among other types and classes of cheeses.

In traditional pasta filata cheesemaking, the quantity of cheese obtained from milk may be increased by adding non-fat dry milk (NFDM) to the fluid milk before coagulation occurs. In an alternative approach, NFDM may also be added before, during, or after the heating, kneading, and stretching steps. However, in this alternative approach the milk proteins in the NFDM lack some of the structural and textural qualities of milk proteins in the cheese curd that have been altered by the enzymatic action of rennet. Among other problems, the NFDM proteins do not impart any significant stiffness or structure to the final cheese product, making it more difficult to cut and shred. Thus, there is a need for new processes of making NFDM that give the milk proteins in the composition qualities that are more similar to the treated proteins in traditional cheese curd. These and other needs are addressed by the present invention.

BRIEF SUMMARY OF THE INVENTION

Embodiments of the invention include methods of making a powdered dairy composition. The methods may include the steps of adding a sequestrant for calcium and rennet to a milk composition to make treated milk, and forming the treated milk into a milk powder.

Embodiments of the invention also include methods of making a powdered dairy composition. The methods may include the step of adding a buffer compound to a fluid milk composition to give the milk composition a pH of about 5.5 or more. They may also include adding an oxidoreductase enzyme to the milk composition, and adding a sequestrant for calcium and rennet to the milk composition to make treated milk. The methods may further include forming the treated milk into a milk powder.

Embodiments of the invention may still further include methods of making a cheese product. The methods may include the steps of forming a cheese curd into a homogeneous cheese mass, mixing a dairy powder into the homogeneous cheese mass, forming the homogeneous cheese mass into a shape, and cooling the homogeneous cheese mass and forming the cheese product. The dairy powder may be made by adding a sequestrant and rennet to a fluid milk composition to make treated milk, and drying the treated milk to form the dairy powder.

Embodiments of the invention may yet further include methods of making a cheese product. The methods may include the steps of providing a slurry, mixing a dairy powder,—and optionally other ingredients—into the slurry, combining the slurry with a cheese precursor to form an admixture, and processing the admixture to form the cheese product. The dairy powder may be made by adding a sequestrant and rennet to a fluid milk composition to make treated milk, and drying the treated milk to form the dairy powder.

Embodiments of the invention may also include additional methods of making a cheese product. The methods may include the steps of providing a slurry, mixing a dairy powder—and optionally other ingredients—into the slurry, combining the slurry with a cheese precursor to form an admixture, processing the admixture to form the cheese product. The dairy powder may be made by adding a buffer, an oxidoreductase enzyme, a sequestrant and rennet to a fluid milk composition to make treated milk, and drying the treated milk to form the dairy powder.

Embodiments of the invention may yet further include powdered non-fat dry milk products. The products may include one or more milk proteins that have been enzymatically altered, where the enzymatically altered proteins are not coagulated. The products may also include one or more sequestrants to bind calcium ions in the powdered product.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

Figure 1:
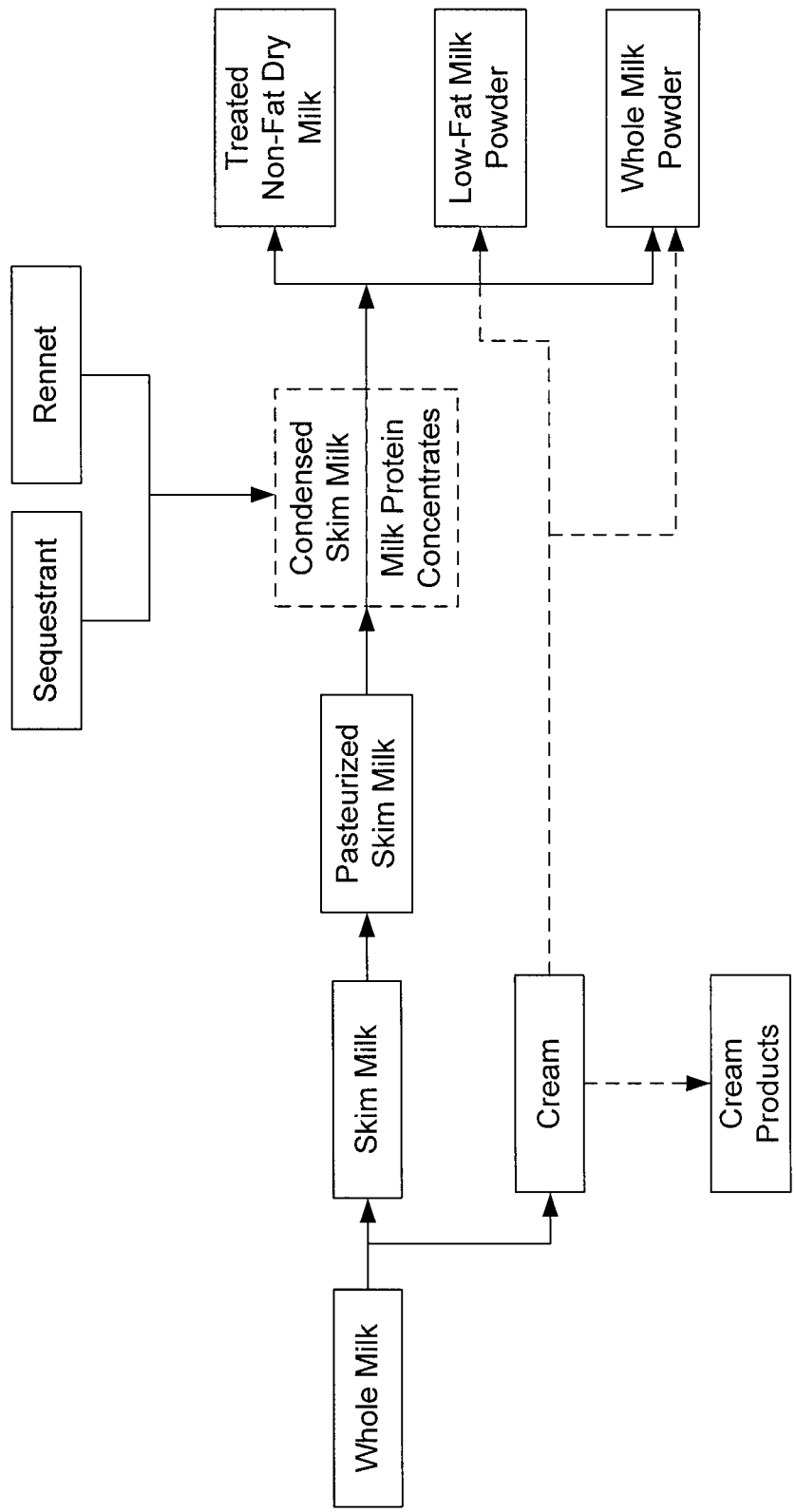
FIG. 1 shows a simplified flowchart of steps for making treated NFDM according to embodiments of the invention.

Methods of making non-fat dry milk (NFDM) compositions are described in which one or more milk proteins in the composition (e.g., casein) have been enzymatically altered by clotting enzymes such as chymosin, the main clotting enzyme in calf rennet. Two types of protein are observed in milk: (1) the globular whey proteins, which are soluble in the whey phase; and (2) caseins, which are phosphoproteins that exist as a stable colloidal suspension. In cow's milk, the caseins include four distinct gene products designated $\alpha_{s1}$-, $\alpha_{s2}$-, $\beta$-, and $\kappa$-caseins. Collectively they can account for about 80% of the milk proteins, and are found in the approximate concentration ratio of 4:1:4:1 $\alpha_{s1}$-casein to $\alpha_{s2}$-casein to $\beta$-casein to $\kappa$-casein. A distinguishing feature of $\kappa$-casein is that it is glycosylated and almost completely lacks phosphoseryl residues along its sequence. $\kappa$-casein can also remain soluble at $Ca^{2+}$ ion concentrations as high as about 15 mM and prevents calcium ion induced precipitation reactions of the other casein types, producing instead a colloidal suspension. The other casein molecules (e.g., $\alpha_{s1}$-, $\alpha_{s2}$-, $\beta$-caseins) are much more sensitive to calcium induced precipitation.

Cheese making steps (e.g., coagulation into curds and whey) utilize the calcium sensitive destabilizing mechanisms built into the colloidal system by, for example, using the natural clotting enzyme chymosin. Chymosin hydrolyzes $\kappa$-casein at the $Phe_{105}$-$Met_{106}$ bond allowing the exposed, calcium sensitive colloidal cores ($\alpha_{s1}$-, $\alpha_{s2}$-, $\beta$-, caseins) to start aggregating once an adequate amount of the $\kappa$-casein has been hydrolyzed. Aggregation leads to larger and larger clusters until ultimately the arrangement achieves a solid-like gel structure. Experimental evidence shows that $\kappa$-casein can be about 60-80% (even up to about 90%) hydrolyzed before significant aggregation and gel formation may occur. Environmental factors influencing the rate and extent of chymosin induced aggregation and gelation include temperature, and calcium ion ($Ca^{2+}$) concentration, among other factors.

In methods of the present invention, the calcium ion concentration in the milk may be controlled by calcium sequestrants. Milk in which sequestrants have bound the ionic calcium may then be treated with chymosin and/or other coagulants. The activity of chymosin progresses unimpeded as it proceeds to hydrolyze the $Phe_{105}$-$Met_{106}$ bond. However, even with the hydrolysis of substantially all the $\kappa$-casein and exposure of the calcium sensitive $\alpha_{s1}$-, $\alpha_{s2}$-, $\beta$-casein colloidal cores, aggregation does not occur to any appreciable extent. A gel structure is not formed. Moreover, this "anti-coagulation" procedure may be easily reversed, allowing a controlled and almost instantaneous coagulation to occur.

When the NFDM powder with the chymosin-altered proteins is subsequently added to milk, cheese curd, cheese admixture, fibrous cheese mass, etc., during one or more stages of a pasta filata process, the environmental conditions may permit the proteins to coagulate. For example, if the treated NFDM is introduced to an acidic environment with sufficiently low pH, the sequestrant bound calcium ions may be released from the sequestrant. The freed calcium may then facilitate the coagulation of the treated proteins. In additional examples, the treated NFDM may be introduced to an environment that already has a calcium ion concentration high enough to supply the calcium needed for coagulation, or alternatively calcium ions may be added so as to induce coagulation.

When the treated NFDM coagulates in the presence of free calcium ions, it imparts texture and structural characteristics to the cheese. For example, the coagulated NFDM increases the stiffness of the cooled cheese to make it easier to dice, cut and/or shred. Because the time consuming step of altering the protein structure with rennet has already occurred, the calcium initiated coagulation of the treated NFDM occurs rapidly. This allows a treated NFDM powder or slurry to be added at any stage of a pasta filata process, including additions before, during, and following the heating, kneading and stretching steps.

Referring now to FIG. 1, a flowchart illustrating selected steps for a method 100 of making treated NFDM according to embodiments of the invention is shown. The method 100 includes providing whole milk 102, which includes a mixture of native milk fats, proteins (e.g., casein) and carbohydrates (e.g., reducing sugars). The fats may then be separated from the whole milk into low (or no) fat skim milk 104 and cream 106 that is concentrated with milk fats. The cream 106 may be further processed into cream products 108 such as sweet cream, butter, plastic cream, and anhydrous milk fat. A portion of the cream 106 may also be used to provide the fat in the low-fat milk powder 118 and whole milk powder 120.

The skim milk 104 may be processed into condensed skim milk 109 and/or milk protein concentrates 111 using conventional techniques. Either before or after the skim milk 104 is converted into the condensed skim milk 109 or the milk protein concentrates 111, a sequestrant 112 may be added that binds to the free calcium ions in the milk products. Alternatively, the sequestrant 112 may be added to the skim milk 104 directly. The sequestrant 112 may include one or more compounds such as disodium diphosphate, trisodium diphosphate, tetrasodium diphosphate, dipotassium diphosphate, tetrapotassium diphosphste, dimagnesium diphosphate, pentasodium triphosphate, pentapotassium triphosphate, sodium polyphosphate, potassium polyphosphate, ammonium polyphosphate, potassium tripolyphosphate, disodium phosphate, dipotassium phosphate, citric acid, lactobionic acid, phosphoric acid, tetrasodium pyrophosphate, sodium metaphosphate, sodium hexametaphosphate, tripotassium phosphate, trisodium citrate, trisodium phosphate, tripotassium citrate, disodium pyrophosphate, disodium ethyyeneaminetetraacetate, sodium gluconate, sodium lactobionate, and/or sodium potassium tripolyphosphate, among other sequestrants. The sequestrant 112 may be added to the milk as a powder, liquid, or aqueous solution.

Rennet 114 is also added to the pasteurized skim milk 110. Embodiments include adding the rennet 114 before the sequestrant 112, simultaneously with the sequestrant 112, or after the sequestrant 112 has been added. The rennet 114 used may be any commercially available rennet for cheese-making, such as rennet derived from animal sources (e.g., veal rennet) and non-animal sources (e.g., rennet derived from *Aspergillus niger*).

When the rennet 114 is added to the skim milk whose free calcium ion concentration has been reduced by sequestrant 112 it is still able to enzymatically alter the native milk proteins. For example, chymosin enzymes in the rennet can still catalyze the conversion of κ-casein proteins in the skim milk to curd protein precursors (e.g., paracasein micelles). However, the reduced levels of free calcium ions prevent the coagulation of the curd protein precursors into a curd coagulum.

The skim milk 110 may be stirred to homogenize the concentration of sequestrant 112 and rennet 114 through the volume of the treated milk. However, the degree of stirring and mechanical agitation of the treated milk may be set below a level where curd coagulation is prevented by mechanical means. It may also be set to a level that maintains the rennet catalyzed protein products (e.g., whey proteins and curd precursors) as a homogenous mixture. Thus, embodiments of the invention include stirring the treated milk mixture to a degree that maintains the homogeneity of the altered milk proteins, and does not result in the separation of the whey proteins from the curd precursor proteins. This may be contrasted with the production of whey depleted rennet casein, which does not use sequestants, and typically uses a high level of continuous agitation to separate curds from the whey protein and prevent the curd from forming a single coagulum.

When the skim milk has been fully treated with the sequestrant 112 and rennet 114 to form a mixture that includes whey proteins and uncoagulated curd proteins (e.g., paracaseins), the water may be removed to form treated NFDM 116. The water removal may be accomplished in a single evaporation step, or may involve a plurality of steps that include concentrating the skim milk by (for example) filtration to separate an aqueous permeate from a protein concentrate retentate, and spray drying the protein concentrate retentate to form a treated NFDM protein concentrate powder. The powder may then be used in cheesemaking processes.

The powder may also be used as a low-fat milk powder 118 that can be reconstituted back into milk. It may also be combined with dairy fats from, for example, the cream initially separated from the whole milk 102 to make a whole milk powder 120.

Figure 2:
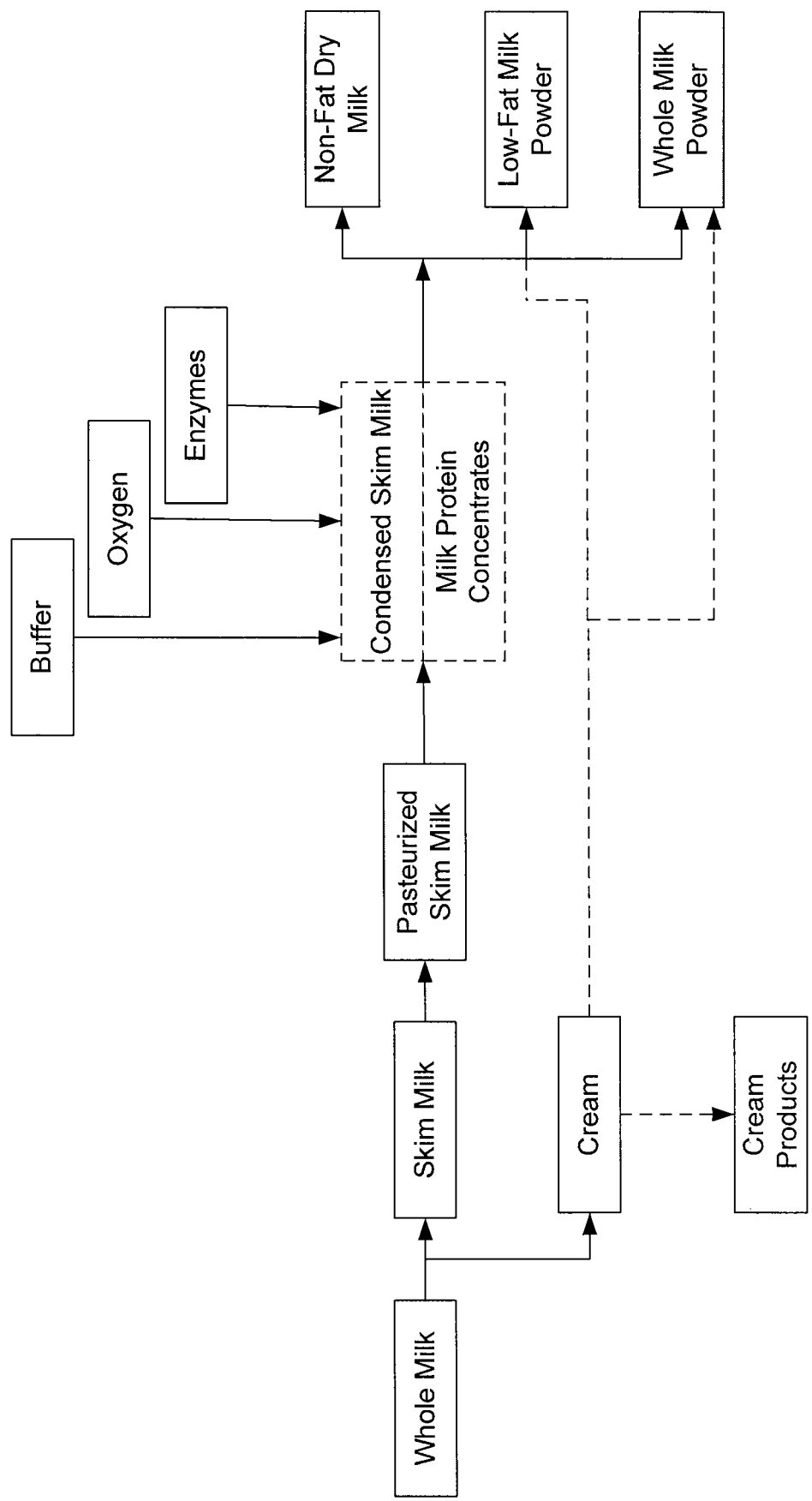
FIG. 2 shows a flowchart of steps for making a NFDM product with decreased levels of reducing sugars.

Additional embodiments of the invention include methods of making NFDM powders that also have fewer reducing sugars as a result of additional enzymatic treatments of the milk. For example, FIG. 2 shows a flowchart of steps in a method 200 for making a NFDM product with decreased levels of reducing sugars. The method 200 starts with separating whole milk 202 into skim milk 204 and cream 206. The cream 206 may be sold as a stand alone product or used to make cream products 208, such as sweet cream. A portion of the cream 106 may also be used to provide the fat in the low-fat milk powder 220 and whole milk powder 222.

The skim milk 204 may be heated to make pasteurized skim milk 210, which may be processed into condensed skim milk 209 and/or milk protein concentrates 211 using conventional techniques. Either before or after the skim milk 204 is converted into the condensed skim milk 209 or the milk protein concentrates 211, the products may be treated with a buffer compound 212, oxygen 214, and enzymes 216 to lower the concentration of reducing sugars in the milk. Alternatively, the buffer compound 212, oxygen 214, and enzymes 216 may be added to the skim milk 204 directly. The enzymes 216 are oxidoreductase enzymes (e.g., hexose oxidase, glucose oxidase, galactose oxidase, pyranose oxidase, and lactose oxidase, catalase, etc.) that enzymatically convert reducing sugars present in the milk (e.g., glucose, galactose, lactose, and other saccharides having an unsubstituted anomeric center) into aldobionate products (e.g., non-reducing sugars and other lactobionate compounds, etc.).

The catalytic activity of the oxidoreductase enzymes may be increased by mixing oxygen 214 and/or adjusting the pH of the milk product with a buffer compound 212 (e.g., calcium hydroxide, calcium carbonate, ammonium carbonate, sodium carbonate, potassium hydroxide, magnesium carbonate, magnesium hydroxide, ammonium hydroxide, sodium hydroxide, aqueous ammonia, etc.). The oxygen may be supplied by pumping compressed air and/or pure oxygen into the milk, and/or by the catalytic reaction of an oxygen precursor (e.g., hydrogen peroxide) with a catalase enzyme. Additional details about processes to catalytically lower the concentration of reducing sugars in milk and milk derivatives (e.g., milk filtrates and permeates, milk separates, etc.) can be found in co-assigned U.S. patent application Ser. No. 11/176,634 to Merrill et al, filed Jul. 6, 2005 and titled "FOOD INGREDIENTS AND FOOD PRODUCTS TREATED WITH AN OXIDOREDUCTASE AND METHODS FOR PREPARING SUCH FOOD INGREDIENTS AND FOOD PRODUCTS" the entire contents of which are herein incorporated by reference for all purposes.

After a portion (e.g., substantially all) of the reducing sugars have been converted into non-reducing sugar compounds, the milk may be made into a non-fat dry milk product 218. The NFDM 218 may be formed by removing the water from the aqueous skim milk solution. The water removal may be accomplished in a single evaporation step, or may involve a plurality of steps that include concentrating the skim milk by (for example) filtration to separate an aqueous permeate from a protein concentrate retentate, and spray drying the protein concentrate retentate to form the NFDM 218 into a powder. The powder may then be used in cheesemaking processes.

The powder with the reduced amount of reducing sugars may also be used as a low-fat milk powder 220 that can be reconstituted back into milk with the addition of water. It may also be combined with dairy fats from, for example, the cream 206 initially separated from the whole milk 202 to make a whole milk powder 222.

Figure 3:
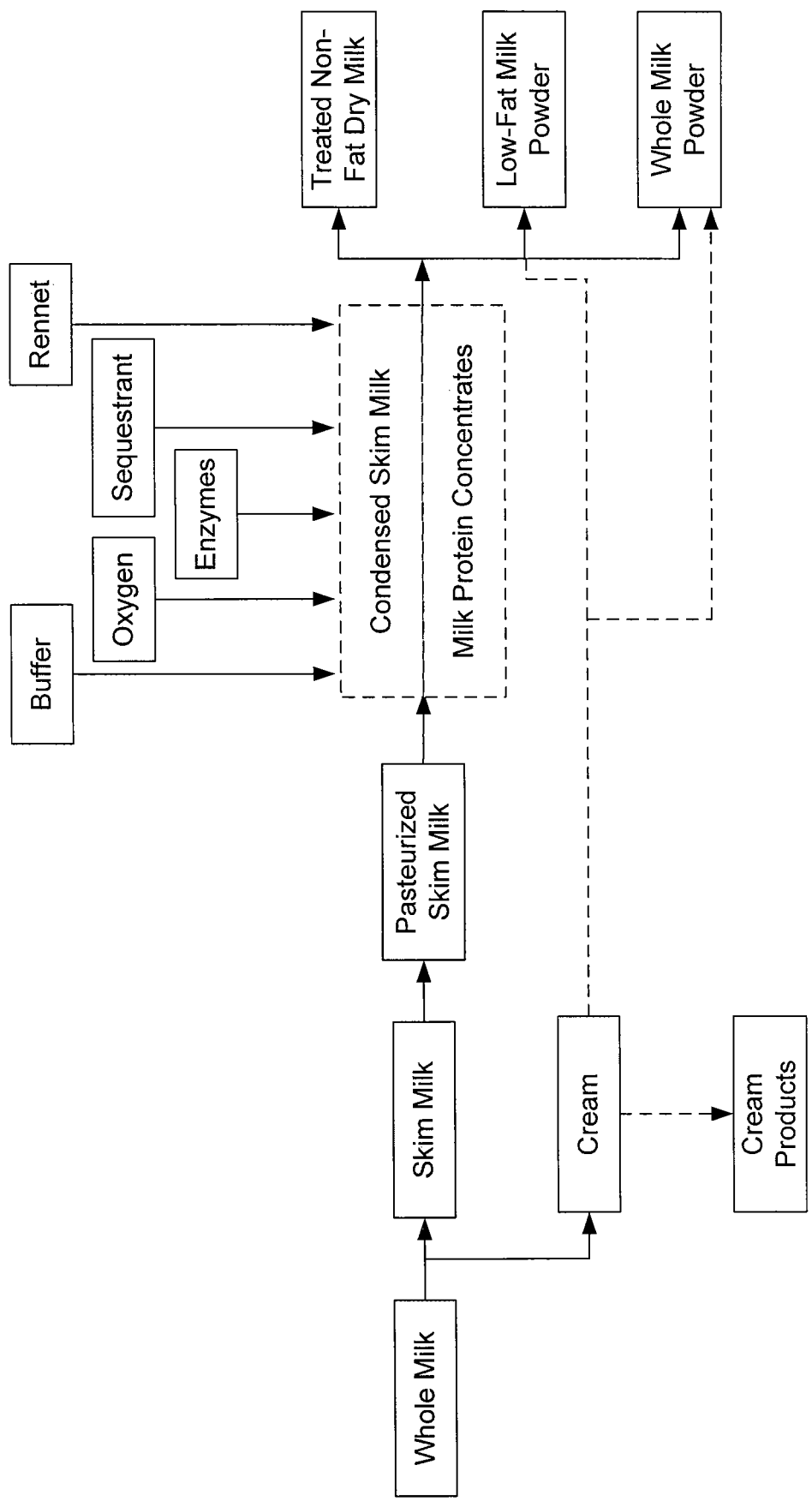
FIG. 3 shows another flowchart of steps for making treated NFDM with decreased levels of reducing sugars according to embodiments of the invention.

The methods described above for making rennet treated NFDM and NFDM with decreased amounts of reducing sugars may be combined into a method 300 shown in FIG. 3 for making a rennet treated NFDM with decreased amounts of reducing sugars. The method 300 may start with separating whole milk 302 into skim milk 304 and cream 306. The cream 306 may be further processed into cream products 308 such as sweet cream. A portion of the cream 106 may also be used to provide the fat in the low-fat milk powder 324 and whole milk powder 326.

The skim milk 304 may be heated to make pasteurized skim milk 310, which may be processed into condensed skim milk 309 and/or milk protein concentrates 311 using conventional techniques. Either before or after the skim milk 304 is converted into the condensed skim milk 309 or the milk protein concentrates 311, the products may be treated with compounds to decrease the concentration of reducing sugars in the milk (e.g., buffer compound 312, oxygen 314, and enzymes 316) and compounds which alter the structure of the native milk proteins (e.g., sequestrant 318 and rennet 320). These compounds may be added all at once, or in a sequential order. Alternatively, compounds may be added directly to the skim milk 304.

When the reducing sugars are reduced and the milk proteins altered by the rennet, the treated milk may be made into a treated non-fat dry milk product 322. The treated NFDM 322 may be formed by removing the water from the aqueous treated milk solution. Water removal may be accomplished in a single evaporation step, or may involve a plurality of steps that include concentrating the treated skim milk by (for example) filtration to separate an aqueous permeate from a protein concentrate retentate, and spray drying the protein concentrate retentate to form the NFDM 322 into a powder that may be used in cheesemaking processes.

The treated NFDM powder may be used as a low-fat milk powder 324 that can be reconstituted back into milk with the addition of water. It may also be combined with dairy fats from, for example, the cream initially separated from the whole milk 302 to make a whole milk powder 326.

It has been unexpectedly observed that when skim milk is treated with buffers (e.g., aqueous ammonia) and subsequently added oxygen and enzymes such as lactose oxidase to eliminate reducing sugars, no additional sequestrant is required to inhibit the aggregation of the rennet treated caseins. While not wishing to be bound by any particular theory, it is believed that when aqueous ammonia is used lactobionic acid, rather than ammonium lactobionate, is formed. The lactobionic acid may be acting as a sequestrant to bind the ionic calcium, and thus preventing the aggregation of rennet treated caseins. The thereby treated NFDM is then concentrated and dried and, upon resolubilization and liberation of the bound calcium or addition of calcium, the rennet treated casein instantly coagulates.

Figure 4:
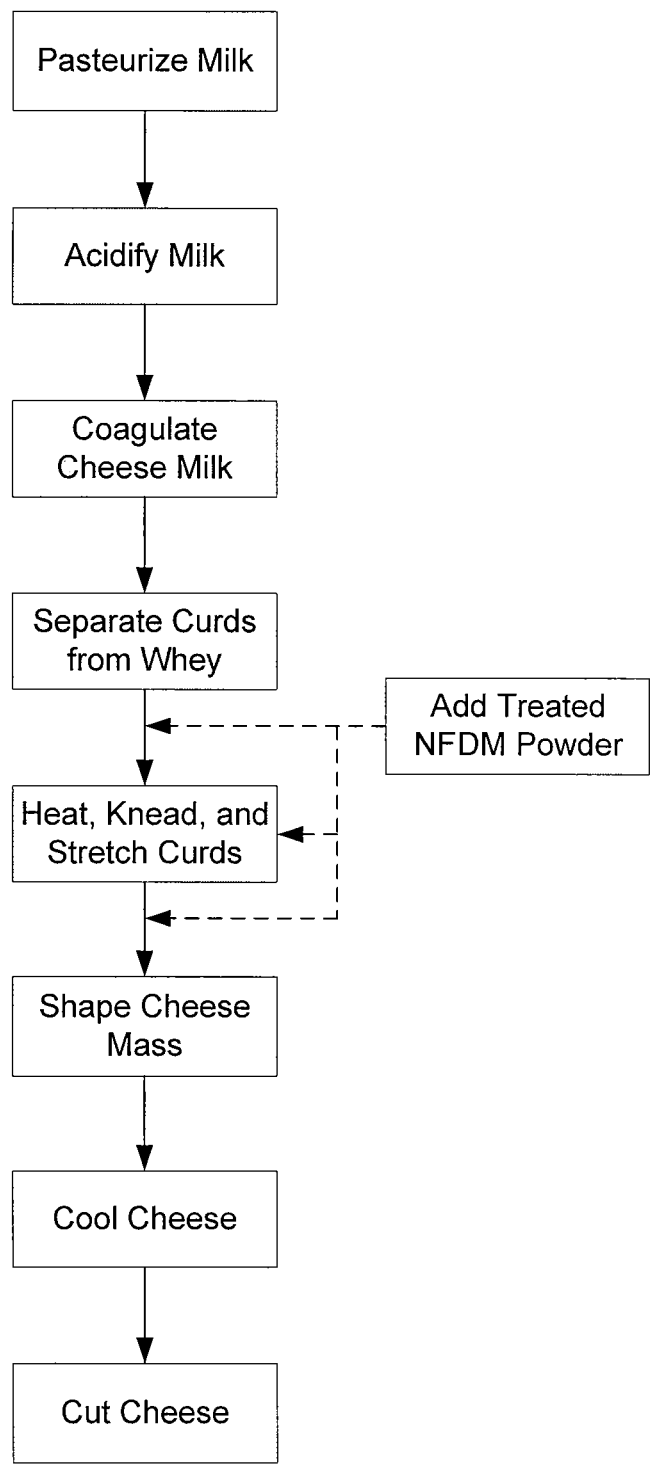
FIG. 4 shows a simplified flowchart illustrating steps of adding treated NFDM powder at various stages of pasta filata processes according to embodiments of the invention.

As noted above, the treated NFDM (either with or without reduced levels of reducing sugars) may be added as an ingredient during cheesemaking. For example, FIG. 4 shows a simplified flowchart illustrating steps in a method 400 of adding treated NFDM powder at various stages of pasta filata processes according to embodiments of the invention. The method 400 may include the steps of pasteurizing milk 402 and acidifying the pasteurized milk 404. Rennet may be added to the acidified milk to convert the native milk proteins into whey and curds that form a mass of coagulated curd 406. The coagulated curd and whey protein may then be separated 408 by, for example, cutting curds and draining the liquid whey protein from the curd mass.

When the curd and whey are separated, embodiments of method 400 may include adding a powder that includes treated NFDM 418 to the curd. The treated NFDM may include rennet treated milk proteins, including whey proteins (e.g., β-lactoglobulin, α-lactalbumin, serum albumin, immunoglobulins, etc.), and curd proteins that have not fully coagulated. The treated NFDM may or may not include reducing sugars such as glucose, galactose, lactose, etc.

Following separation step 408, the curds (which may also include treated NFDM powder) may be heated, kneaded and stretched into a fibrous cheese mass 410. A powder including the treated NFDM may be added 418 during the stage, and/or after the heating, kneading and stretching step 410 and before the cheese mass is shaped 412 into, for example, a ribbon. Additional details on how dry powder ingredients may be added to cheese during a pasta filata cheese making process are described in co-assigned U.S. Pat. No. 5,902,625 to Barz et al, titled "PROCESS OF MAKING A SOFT OR SEMI-SOFT FIBROUS CHEESE", the entire contents of which are herein incorporated by reference for all purposes.

As noted above, when the treated NFDM powder is added to the curd or cheese mass, the conditions are such that calcium ion concentrations are high enough to cause the renneted milk proteins to coagulate. In some instances, the calcium ions are supplied (at least in part) by the release of bound calcium from sequestrants in the treated NFDM powder. The calcium ions are released from these sequestrants when the pH drops to a sufficiently low level for the sequestrant used (e.g., about 5.0 to about 6.4).

In additional instances, the calcium ions are supplied by adding a source of these ions to the curds or cheese with the treated NFDM powder (e.g., by adding calcium chloride, calcium carbonate, calcium phosphate; organic calcium salts like calcium citrate, calcium lactate, calcium lactate gluconate, calcium gluconate, calcium lactobionate, etc., either as solid powders or aqueous solutions, to the curds and/or cheese mass). A drop of about 33% or more of the original calcium ion concentration is believed to completely inhibit the coagulation of renneted milk proteins. Thus, raising the free calcium ion concentration to about 67% or more of its original concentration in fresh milk may start the coagulation. For example, additional calcium may be added to achieve a free calcium ion concentration of about 0.01% wt. to about 2.0% wt.

As the renneted milk proteins coagulate, they impart additional structure to the curd or fibrous cheese mass. This structure can increase the firmness, elasticity, and cohesiveness of the cheese formed by shaping the cheese mass 412 and cooling the shaped cheese 414. For example, a cheese mass containing the coagulated proteins may be shaped 412 into a cheese ribbon having a width of about 6 inches to about 36 inches, and a thickness of about 0.25 inches to about 3 inches. The soft ribbon may be conveyed through a cooling system such as brine that cools 414 and stiffens the cheese. As the cooled ribbon emerges from the cooling system, it may be cut 416 into rectangular cheese palates (e.g., about 12 inches to 24 inches long). The palates may then be stacked and transported to systems that shred, cut, dice, etc., the cheese into smaller sizes (e.g., shredded cheese for pizza). The coagulation of the treated NFDM imparts additional structure and firmness that makes the cheese easier to form into a diced and/or shredded final cheese product.

Figure 5:
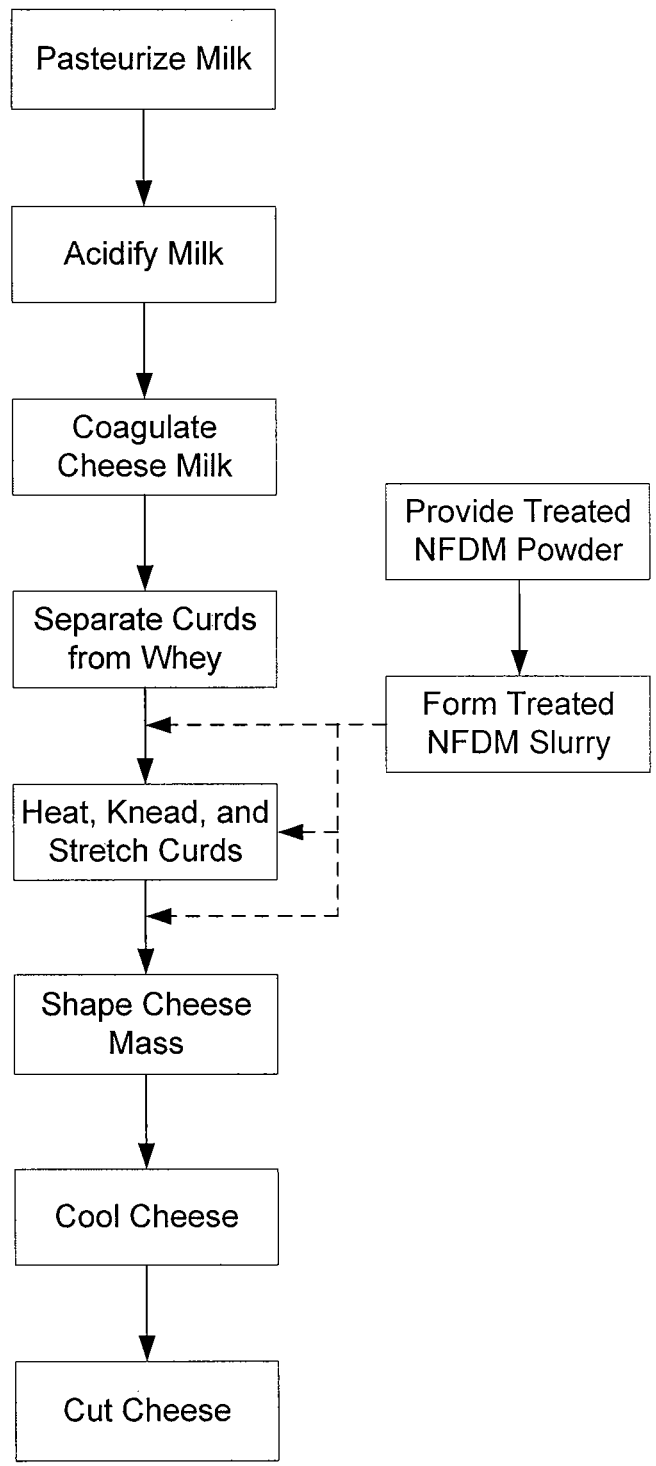
FIG. 5 shows a simplified flowchart illustrating steps of adding a slurry containing treated NFDM at various stages of pasta filata processes according to embodiments of the invention.

The treated NFDM may also be added in a slurry to the curd or fibrous cheese mass. For example, FIG. 5 shows a simplified flowchart illustrating steps of a method 500 for adding a slurry containing treated NFDM at various stages of pasta filata processes according to embodiments of the invention. Similar to FIG. 4, method 500 may include the steps of pasteurizing milk 502, acidifying the milk 504 and adding rennet and other ingredients to coagulate a portion of the milk proteins into curds and whey 506. The solid curds are separated from the whey 508, and the curds may be heated, kneaded and stretched into a fibrous cheese mass 510.

Before, during, or immediately following the heating/kneading/stretching step 510, a liquid slurry that includes treated NFDM may be added 520 to the curds and/or fibrous cheese mass. For example, the slurry containing the treated NFDM may be added to the curds before they enter step 510. The slurry may be poured and/or sprayed onto the curds, and may be mixed into the curds before they are heated, kneaded and stretched. Slurry may be added at some point as the curds are heated, kneaded and stretched into a fibrous cheese mass. Slurry may also be added to the fibrous cheese mass before it is shaped 512 into a shaped cheese mass. The slurry may be added to the curds and/or fibrous cheese mass at a plurality of these points in the cheese making process.

The slurry may be prepared by providing NFDM powder 118 to one or more additional ingredients in a liquid (e.g., an aqueous solution). These additional ingredients may include, for example, one or more of untreated nonfat dry milk, milk protein (e.g., additional whey proteins), acidity regulators, acids, anticaking agents, anti-foaming agents, coloring agents, emulsifiers, enzymes and/or enzyme preparations, flavoring agents, firming agents, food proteins, gelling agents, preservatives, sequestrants, stabilizers, starches, thickeners, oils, fats, cheese powders, salts (e.g., calcium salts), nutritional supplements, neutraceuticals, carbohydrates, vitamins, minerals, and other generally recognized as safe (GRAS) food ingredients, among other ingredients. The additional ingredients may include ingredients that initiate the coagulation of the treated NFDM (e.g., calcium salts, acids that lower the pH to a point where sequestrant bound calcium is released, etc.). Additional details about preparing a slurry may be found in co-assigned U.S. patent application Ser. No. 11/121,537, titled "CHEESE AND METHODS OF MAKING SUCH CHEESE"; U.S. patent application Ser. No. 11/122,283, titled "BLENDED CHEESES AND METHOD FOR MAKING SUCH CHEESES"; and U.S. patent application Ser. No. 11/121,398, titled "METHODS FOR MAKING SOFT OR FIRM/SEMI-HARD RIPENED AND UNRIPENED CHEESE AND CHEESES PREPARED BY SUCH METHODS", all three applications being filed on May 3, 2005, and all three herein incorporated by reference in their entireties for all purposes.

Following the addition of the treated NFDM slurry to the curds and/or fibrous cheese mass, the cheese may be shaped 512, cooled 514 and cut 516 into a final cheese product. For example, the cheese mass containing the coagulated proteins may be shaped 512 into a soft cheese ribbon, block, or string cheese that is conveyed through a cooling system such as a brine belt that cools 414 and stiffens the cheese. As the cooled ribbon emerges from the cooling system, it may be cut 516 into cheese palates and transported to systems that shred, cut, dice, etc., the cheese into smaller sizes (e.g., shredded cheese for pizza). The coagulation of the treated NFDM imparts additional structure and firmness that makes the cheese easier to form into a diced and/or shredded final cheese product.

EXPERIMENTAL

Figure 6:
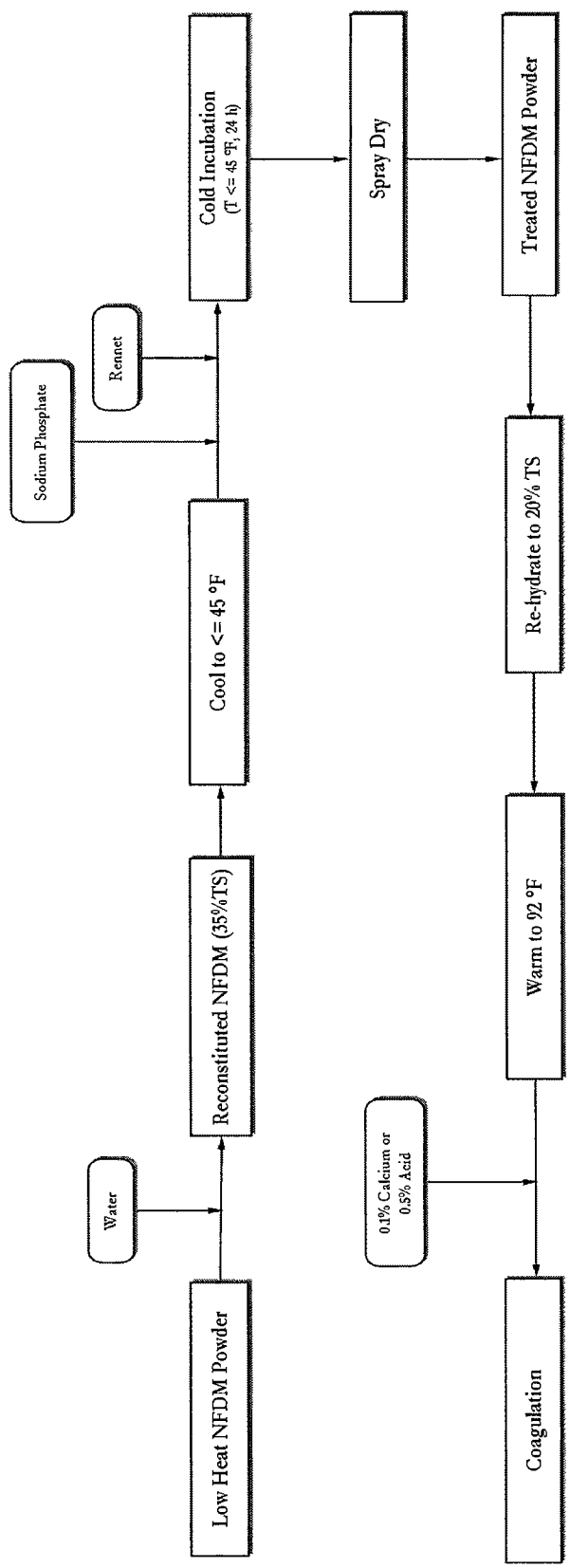
FIG. 6 shows a flowchart of process steps carried out in an experimental process for making treated NFDM according to embodiments of the invention.

FIG. 6 shows a flowchart of process steps carried out in an experimental process for making treated NFDM according to embodiments of the invention. The experimental process produced a 35% (w/w) reconstituted non-fat dry milk (NFDM) solution (50 lbs) by combining 18.19 lbs of Grade A low heat NFDM powder having 96.2% in dry matter and 33.4% in protein (obtained from Dairy America, Fresno, Calif.) with 31.81 lbs of water at 125° F., using a mechanical mixer with controlled mixing speed.

The combined solution was cooled to 45° F. and 0.067 lbs of sodium phosphate was added over a 10 minute mixing period. A microbial rennet (CHY-MAX™ Ultra, 0.0525 lbs), diluted 10-fold with chilled water, was also added to the solution with gentle agitation for 10 minutes. The solution was incubated at cold temperature (T<=45° F.) with no agitation for 24 hours.

After a reaction time with the rennet for 24 hours, there was no coagulation (gelling) observed. Agitation was started, followed by spray drying of the NFDM liquid to obtain the Treated NFDM powder. The Treated NFDM powder was re-hydrated to a solution (TS=20%) and warmed to 92° F. The addition of 0.1% calcium or 0.5% acid caused the rehydrated NFDM solution to coagulate and form a firm cheese curd.

Having described several embodiments, it will be recognized by those of skill in the art that various modifications, alternative constructions, and equivalents may be used without departing from the spirit of the invention. Additionally, a number of well-known processes and elements have not been described in detail in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the electrode" includes reference to one or more electrodes and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A method of making a powdered dairy composition, the method comprising:
    adding a sequestrant for calcium and rennet directly to milk to make treated milk, wherein the sequestrant for calcium is added as a powder or aqueous solution to the milk, and wherein the sequestrant reduces a free calcium ion concentration in the treated milk to a level that prevents aggregation of rennet hydrolyzed milk proteins in the treated milk into a curd coagulum; and
    forming the treated milk into a treated milk powder, wherein the treated milk powder comprises substantially no aggregation of the rennet hydrolyzed milk proteins.

2. The method of claim 1, wherein the treated milk powder is a non-fat dry milk powder.

3. The method of claim 1, wherein the sequestrant is selected from the group consisting of phosphates, pyrophosphates, diphosphates, triphosphates, polyphosphates, carbonates, aldobionic acids, and citrates.

4. The method of claim 1, wherein the sequestrant comprises disodium diphosphate, trisodium diphosphate, tetrasodium diphosphate, dipotassium diphosphate, tetrapotassium diphosphste, dimagnesium diphosphate, pentasodium triphosphate, pentapotassium triphosphate, sodium polyphosphate, potassium polyphosphate, ammonium polyphosphate, potassium tripolyphosphate, disodium phosphate, dipotassium phosphate, citric acid, lactobionic acid, phosphoric acid, tetrasodium pyrophosphate, sodium metaphosphate, sodium hexametaphosphate, tripotassium phosphate, trisodium citrate, trisodium phosphate, tripotassium citrate, disodium pyrophosphate, disodium ethyleneaminetetraacetate, sodium gluconate, sodium lactobiinate, gluconic acid, or sodium potassium tripolyphosphate.

5. The method of claim 1, wherein the sequestrant comprises sodium hexametaphosphate, potassium tripolyphosphate, or tetrasodium pyrophosphate.

6. The method of claim 1, wherein the forming of the treated milk into a treated milk powder comprises:
concentrating milk solids from the treated milk to form a milk concentrate; and
spray drying the milk concentrate to form the milk powder.

7. The method of claim 1, wherein the treated milk powder is made part of a slurry that is added to a cheese precursor to form an admixture.

8. The method of claim 7, wherein the admixture is formed into a cheese product.

9. A method of making a powdered dairy composition, the method comprising:
adding a buffer compound to milk to give the milk a pH of about 5.5 or more;
adding oxidoreductase enzymes to the milk;
adding a sequestrant for calcium and rennet directly to the milk to make treated milk, wherein the sequestrant for calcium is added as a powder or aqueous solution to the milk, and wherein the sequestrant reduces a free calcium ion concentration in the treated milk to a level that prevents aggregation of rennet hydrolyzed milk proteins in the treated milk into a curd coagulum; and
forming the treated milk into a milk powder, wherein the milk powder comprises substantially no aggregation of the rennet hydrolyzed milk proteins.

10. The method of claim 9, wherein the method further comprises adding oxygen to the milk.

11. The method of claim 9, wherein the method further comprises adding a catalase enzyme to the milk.

12. The method of claim 9, wherein the oxidoreductase enzyme is selected from the group consisting of hexose oxidase, glucose oxidase, galactose oxidase, pyranose oxidase, cellobiose oxidase, carbohydrate oxidase, and lactose oxidase.

13. The method of claim 9, wherein the buffer comprises calcium hydroxide, calcium carbonate, ammonium carbonate, aqueous ammonia, sodium carbonate, potassium hydroxide, magnesium carbonate, magnesium hydroxide, ammonium hydroxide, or sodium hydroxide.

14. The method of claim 9, wherein the sequestrant is selected from the group consisting of phosphates, pyrophosphates, lactobionic acid, diphosphates, triphosphates, polyphosphates, carbonates, aldobionic acids, and citrates.

15. The method of claim 9, wherein the forming of forming the treated milk into a milk powder comprises:
concentrating milk solids from the treated milk to form a milk concentrate; and
spray drying the milk concentrate to form the milk powder.

16. A method of making a cheese product comprising:
forming a cheese curd into a homogeneous cheese mass;
mixing a dairy powder into the homogeneous cheese mass;
forming the homogeneous cheese mass into a shape; and
cooling the homogeneous cheese mass and forming the cheese product,
wherein the dairy powder is made by:
adding a sequestrant and rennet directly to milk to make treated milk, wherein the sequestrant for calcium is added as a powder or aqueous solution to the milk, and wherein the sequestrant reduces a free calcium ion concentration in the treated milk to a level that prevents aggregation of rennet hydrolyzed milk proteins in the treated milk into a curd coagulum; and
drying the treated milk to form the dairy powder, wherein the dairy powder comprises substantially no aggregation of the rennet hydrolyzed milk proteins.

17. The method of claim 16, wherein the dairy powder comprises a non-fat dry milk powder.

18. A method of making a cheese product comprising:
providing a slurry;
mixing a dairy powder into the slurry;
combining the slurry with a cheese precursor to form an admixture; and
processing the admixture to form the cheese product,
wherein the dairy powder is made by:
adding a sequestrant and rennet directly to milk to make treated milk, wherein the sequestrant for calcium is added as a powder or aqueous solution to the milk, and wherein the sequestrant reduces a free calcium ion concentration in the treated milk to a level that prevents aggregation of rennet hydrolyzed milk proteins in the treated milk into a curd coagulum; and
drying the treated milk to form the dairy powder, wherein the dairy powder comprises substantially no aggregation of the rennet hydrolyzed milk proteins.

19. The method of claim 18, wherein the dairy powder comprises a non-fat dry milk powder.

20. A method of making a cheese product comprising:
providing a slurry;
mixing a dairy powder into the slurry;
combining the slurry with a cheese precursor to form an admixture; and
processing the admixture to form the cheese product,
wherein the dairy powder is made by:
adding a buffer, an oxidoreductase enzyme, a sequestrant and rennet directly to milk to make treated milk, wherein the sequestrant for calcium is added as a powder or aqueous solution to the milk, and wherein the sequestrant reduces a free calcium ion concentration in the treated milk to a level that prevents aggregation of rennet hydrolyzed milk proteins in the treated milk into a curd coagulum; and
drying the treated milk to form the dairy powder, wherein the dairy powder comprises substantially no aggregation of the rennet hydrolyzed milk proteins.

21. The method of claim 20, wherein the dairy powder comprises a non-fat dry milk powder.

22. A method of making a cheese product comprising:
providing a cheese;
mixing a dairy powder with the cheese to make a mixed cheese, wherein the dairy powder is made by adding a sequestrant and rennet directly to milk to make treated milk, and wherein the sequestrant for calcium is added as a powder or aqueous solution to the milk, and further wherein the sequestrant reduces a free calcium ion concentration in the treated milk to a level that prevents aggregation of rennet hydrolyzed milk proteins in the treated milk into a curd coagulum;
drying the treated milk to form the dairy powder, wherein the dairy powder comprises substantially no aggregation of the rennet hydrolyzed milk proteins;
forming the mixed cheese and the dairy powder into a homogeneous cheese mass;
forming the homogeneous cheese mass into a shape; and
cooling the homogenous mass and forming the cheese product.

23. The method of claim 22, wherein the dairy powder comprises a non-fat dry milk powder.

24. A method of making a cheese product comprising:
mixing a dairy powder into a cheese curd;
forming the cheese curd into a homogeneous cheese mass;
forming the homogeneous cheese mass into a shape; and
cooling the homogeneous cheese mass and forming the cheese product,
wherein the dairy powder is made by:
adding a sequestrant and rennet directly to milk to make treated milk, wherein the sequestrant for calcium is added as a powder or aqueous solution to the milk, and wherein the sequestrant reduces a free calcium ion concentration in the treated milk to a level that prevents aggregation of rennet hydrolyzed milk proteins in the treated milk into a curd coagulum; and
drying the treated milk to form the dairy powder, wherein the dairy powder comprises substantially no aggregation of the rennet hydrolyzed milk proteins.

25. A powdered non-fat dry milk product comprising:
one or more milk proteins that have been hydrolyzed by chymosin directly added to milk, wherein the chymosin hydrolyzed proteins are not coagulated; and
a sequestrant to bind calcium ions in the powdered product, wherein the sequestrant is directly added to the milk in an amount sufficient to prevent the chymosin hydrolyzed proteins from coagulating, and wherein the sequestrant for calcium is added as a powder or aqueous solution to the milk.

26. The powdered non-fat dry milk product of claim 25, wherein the chymosin hydrolyzed proteins coagulate upon addition of an ionic calcium source to the product.

27. The powdered non-fat dry milk product of claim 25, wherein the chymosin hydrolyzed proteins coagulate upon addition of an acid to the product.

28. The powdered non-fat dry milk product of claim 25, wherein the product further comprises a buffer, oxygen, a catalase enzyme, or an oxidoreductase enzyme.

* * * * *